United States Patent Office 3,452,526
Patented July 1, 1969

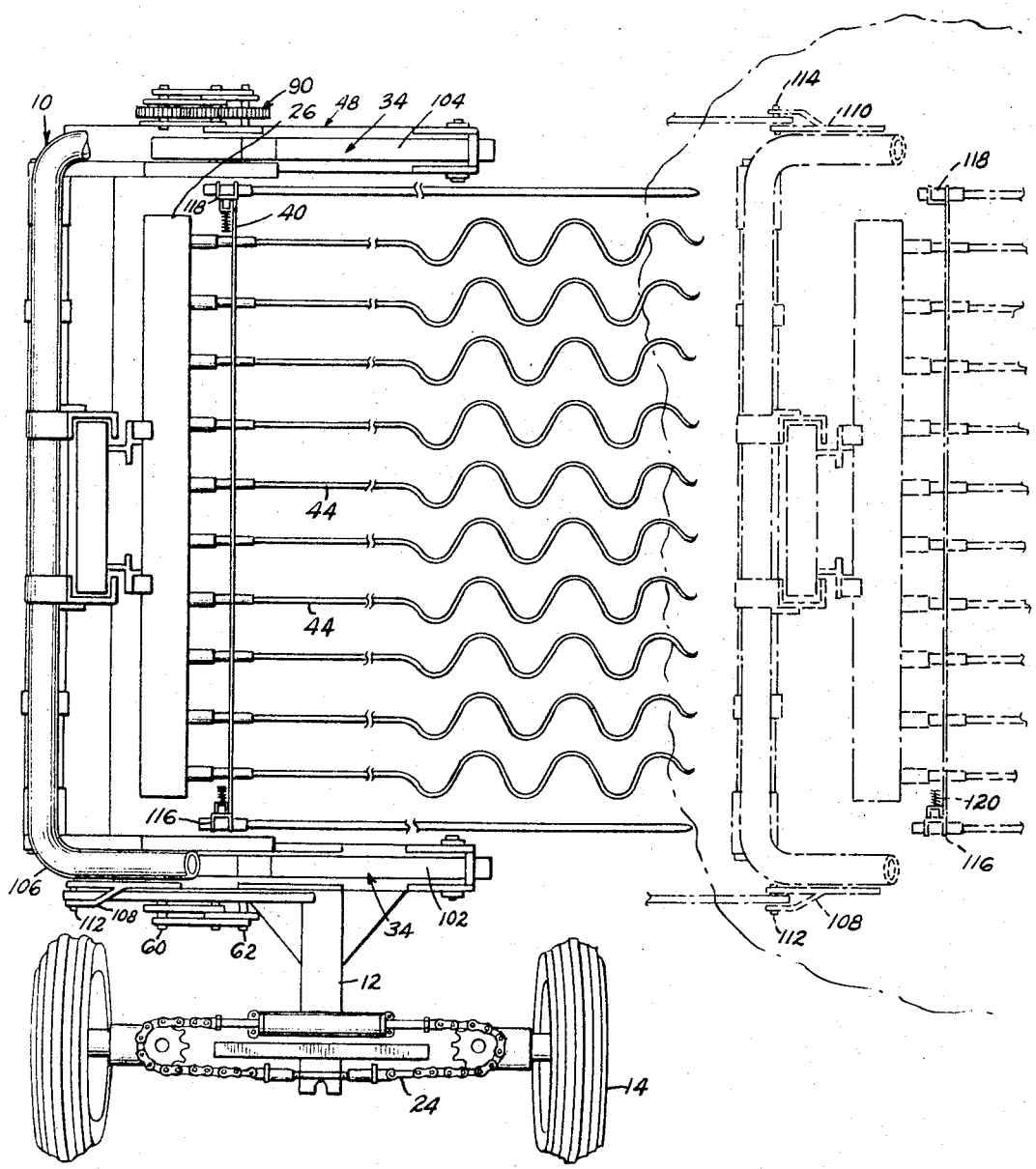

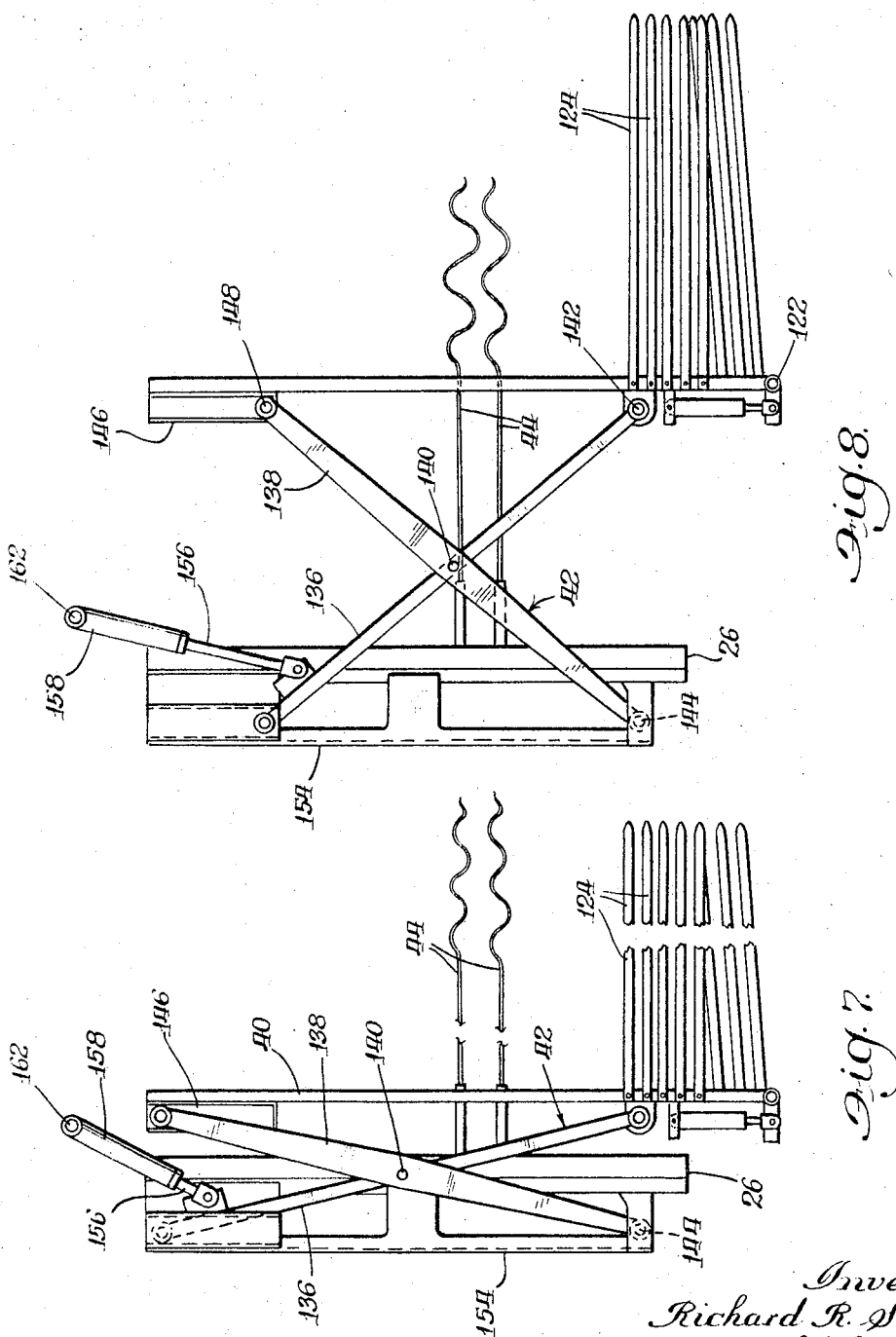

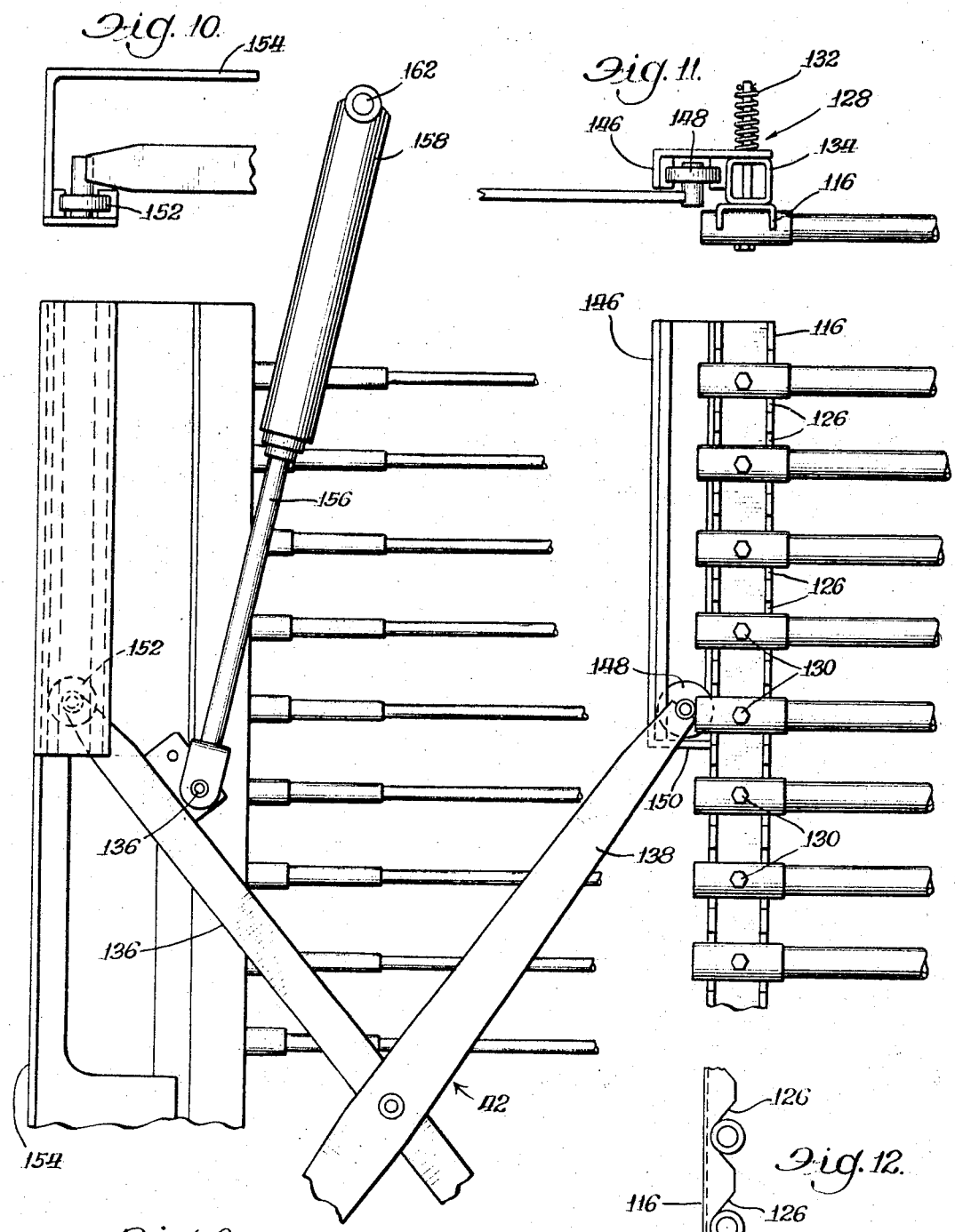

3,452,526
HARVESTING MACHINE
Richard R. Steingas, Naperville, and Harold G. Meitl, Clarendon Hills, Ill., assignors to International Harvester Company, Chicago, Ill., a corporation of Delaware
Filed Oct. 17, 1966, Ser. No. 587,184
Int. Cl. A01g 19/08
U.S. Cl. 56—328        20 Claims

ABSTRACT OF THE DISCLOSURE

A mounting for a fruit picking panel comprising a linkage supporting the panel from a support, the linkage having elements thereof connected to a gearing for moving such elements at predetermined rates to hold the panel in desired positions as it is advanced toward and retracted from a fruit-bearing tree.

---

This invention relates to a fruit harvesting machine and more particularly to a linkage mechanism and control means for advancing and retracting a fruit picker panel into and out of a tree or plant.

One of the problems that has been encountered in moving a fruit picker panel into and out of a tree is that the panel which usually has a fruit receiving receptacle on its underside is tilted during the translating motion. This sometimes causes the fruit to roll to one side or the other either piling up to an undesirable height at one side or rolling out at the other depending on the tilt of the panel and the receiving receptacle attached thereto. Since the bottom of the receiving receptacle is usually horizontal and disposed substantially at right angles with the fruit picker panel it is desirable to maintain the panel in a substantially vertical position during its translation movement into or out of a tree, especially out of the tree so as not to lose the fruit.

Since the panel has protruding therefrom, and substantially perpendicular thereto, a plurality of fruit picking spindles, it is desirable from another point of view to hold the panel in a substantially vertical position during lateral translation movement into or out of a tree. This obviously permits the horizontally disposed spindles to enter the tree along a relatively straight line rather than in a skewed position.

A principal object of this invention, therefore, is to provide a means for holding a fruit picker panel in a predetermined position as the panel is thrust into a plant or tree.

Another object is to provide a linkage mechanism and gearing arrangement to accomplish the aforementioned object.

Another object is to provide a gearing arrangement associated with the picking panel translation mechanism which delivers a variable output whereby the picker panel is maintained in a predetermined position during lateral movement.

A further object is to provide means for thrusting side rods into a plant or tree said means being operative independently of the fruit picker panel.

The above and other objects and advantages of the invention will be more readily apparent when read in connection with the accompanying drawings in which:

FIGURE 2 is a plan view of the fruit harvesting unit of FIGURE 1;

FIGURE 7 is a side view of a scissors linkage mechanism connecting side rods to a picker panel, the side rods being shown in their retracted position;

FIGURE 8 is a side view of the scissors linkage mechanism of FIGURE 6 with the side rods in their extended position;

FIGURE 9 is an enlarged partial side view of the scissors linkage mechanism of FIGURE 8;

FIGURE 10 is a partial plan view of the scissors linkage guide means connection to the picker panel;

FIGURE 11 is a partial plan view of the scissors linkage guide means connection to the side rod frame; and FIGURE 12 is a partial side view of the side rod frame and the side rods associated therewith.

Figure 1:
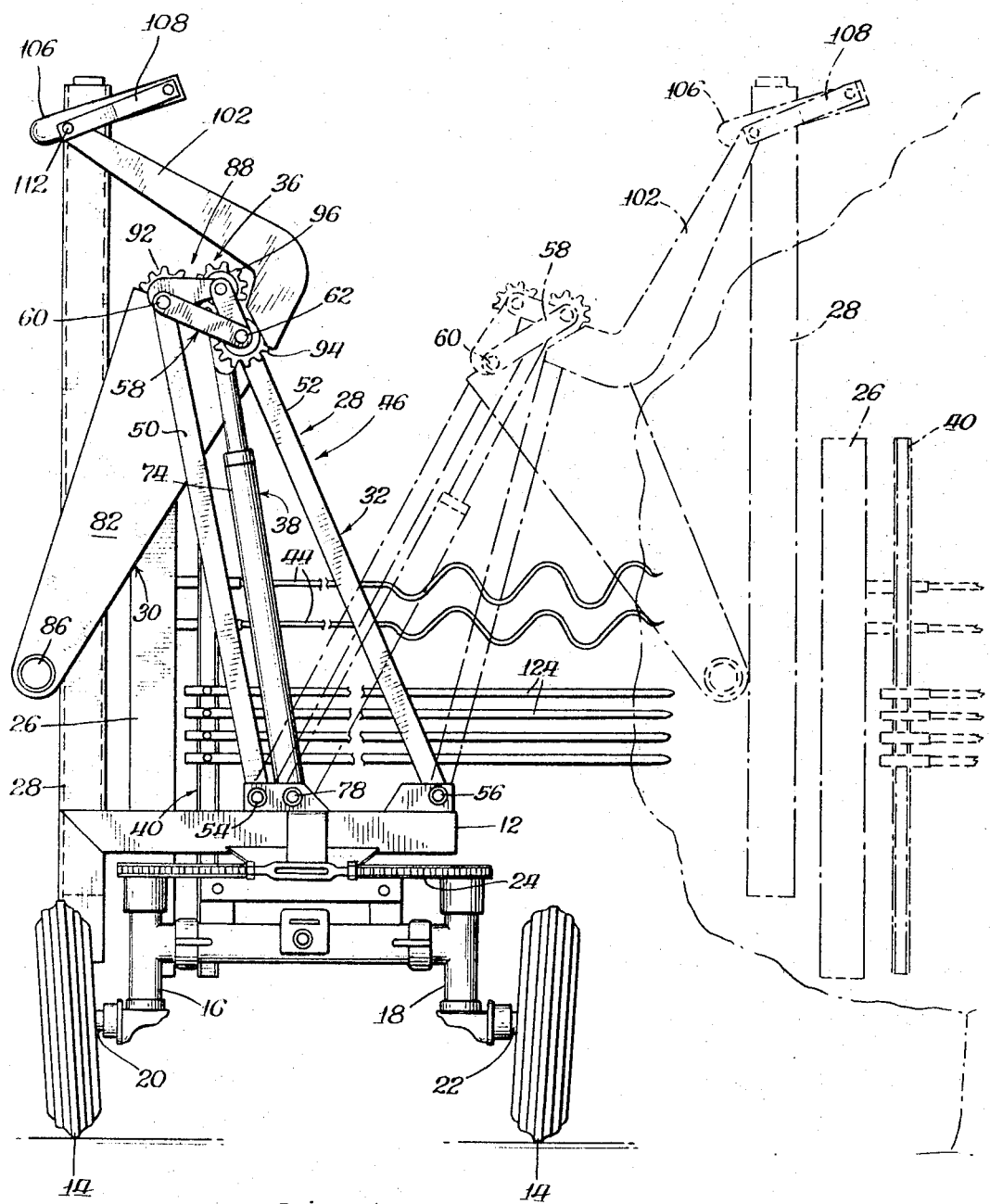
FIGURE 1 is a front-elevational view of a fruit harvesting unit embodying the present invention.
Figure 4:
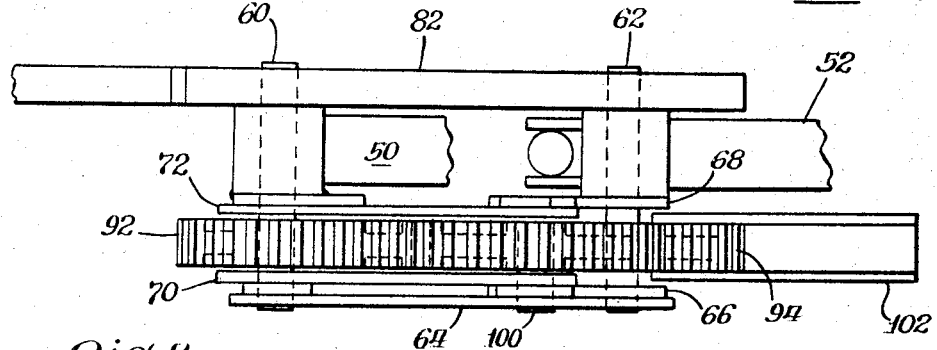
FIGURE 4 is a plan view of the linkage mechanism and gear arrangement of FIGURE 3.

Referring now to the drawings wherein like numerals on the different views identify identical parts, 10 designates generally a mobile fruit harvesting unit which is adapted to be attached to a tractor or may be part of a self propelling unit as described, for example, in U.S. Patent No. 3,153,311 to S. D. Pool, issued Oct. 20, 1964. The unit 10 comprises a frame member 12 mounted on steerable wheels 14 located at the forward end of the unit. L-shaped arm members 16 and 18 are connected to frame member 12 by suitable means (not shown), the wheels 14 being mounted on axle extensions 20 and 22 associated with said arm members 16 and 18 respectively. The wheels are steerable through the chain and sprocket arrangement 24 which is actuated by suitable control means (not shown).

The unit 10 also comprises fruit picker panel 26, a supporting frame 28 for the fruit picker panel, thrust arm means 30 for carrying and supporting the frame 28 and the fruit picker panel attached thereto, linkage means 32 for moving the fruit picker panel laterally, upper guide and support arm means 34, relative motion control means 36 associated with the linkage means and thrust arm means and actuating means 38 for manipulating the linkage means. The unit 10 also comprises an auxiliary frame 40 connected to the fruit picker panel 26 by a scissors type linkage 42.

The panel 26 may be of the type disclosed in the above-mentioned U.S. Patent No. 3,153,311 having disposed therein a plurality of fruit picking spindles 44. As shown, these spindles are of the type disclosed in U.S. Patent No. 3,210,921 to T. A. Middlesworth et al. issued Oct. 12, 1965; however, they may also be spindles of the type disclosed in above-mentioned U.S. Patent No. 3,153,311.

The supporting frame 28 is a vertically extending frame structure having the picker panel 26 attached thereto and moveable vertically, thereon in the manner as disclosed in U.S. Patent No. 3,153,311.

The linkage means 32 comprises a pair of identical four bar linkages 46 and 48 disposed respectively at the front and rear ends of the unit 10. The linkage 46 comprises elongated link members 50 and 52 pivotally mounted at 54 and 56 respectively on the frame member 12. The upper ends of link members 50 and 52 are connected to link structure 58 by pivotal connections here shown in the form of pins 60 and 62. The link structure 58 as here shown defines a substantially triangular structure including flat bar members 64, 66 and 68, 70 and 72 assembled to form the link structure.

The linkage actuating means 38 is an extensible piston-cylinder arrangement 74-76 pivotally mounted at 78 on the frame 12 and pivotally connected to the upper end of link member 52 at 80. When the piston cylinder arrangement is hydraulically actuated to an extended position as shown in dotted lines in FIGURE 1 the linkage 46 is moved about its pivotal mountings 54 and 56, and the cylinder 74 is moved about its pivotal mounting 78.

The four-bar linkage 48 at the rear of the unit 10 has a similar piston-cylinder arrangement 74–76 connected thereto which operates in the same manner and simultaneously with the piston cylinder arrangement connected to linkage 46 at the front end of the unit 10.

The thrust arm means comprises a pair of elongated triangular shaped thrust arm members 82 and 84 disposed respectively at the forward and rear ends of unit 10. Member 82 is connected to linkage 46, the upper end of member 82 being connected to link structure 58 by means of the pivot pin mounting members 60 and 62. Thus when linkage 46 is actuated the thrust arm 82, which forms essentially a rigid connection with link structure 58, moves with the latter as shown in FIGURE 1. The lower ends of the two thrust arm members 82 and 84 are interconnected by a tubular cross-bar member 86 to which the picker panel supporting frame 28 is pivotally attached. Thus as the thrust arm means 30 is moved by actuation of the linkage means, the fruit picker panel is moved laterally to a variety of positions, one of such positions being illustrated by the dotted line position in FIGURE 1.

Figure 5:
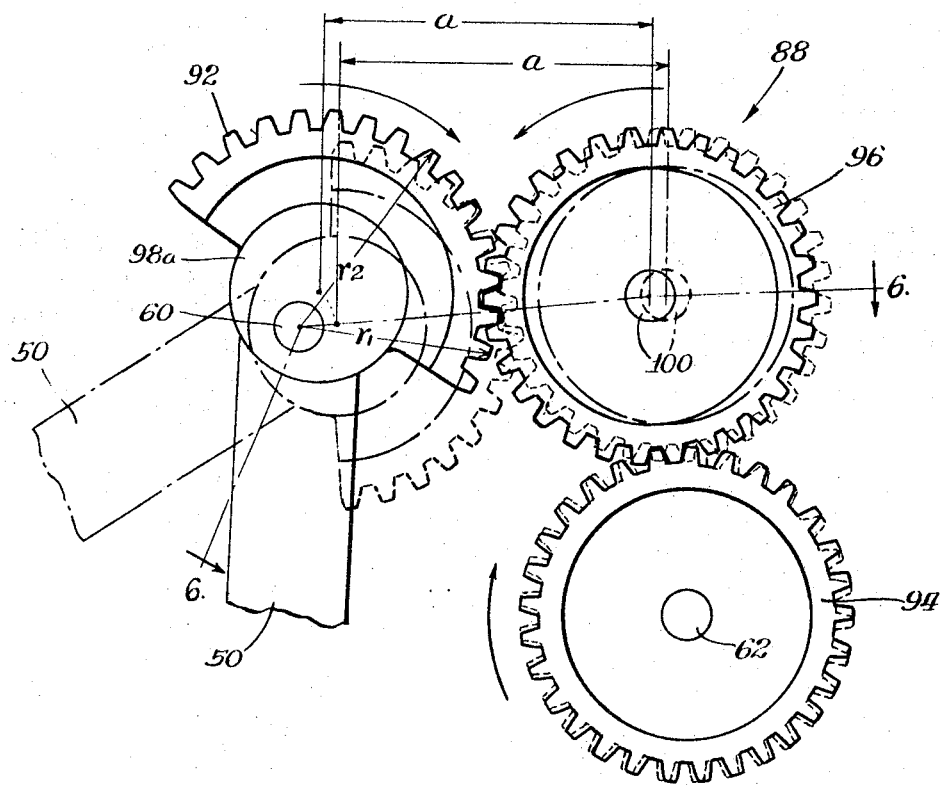
FIGURE 5 is an enlarged elevational view of the gearing arrangement showing the relative positions of the gears with different positions of the linkage.
Figure 6:
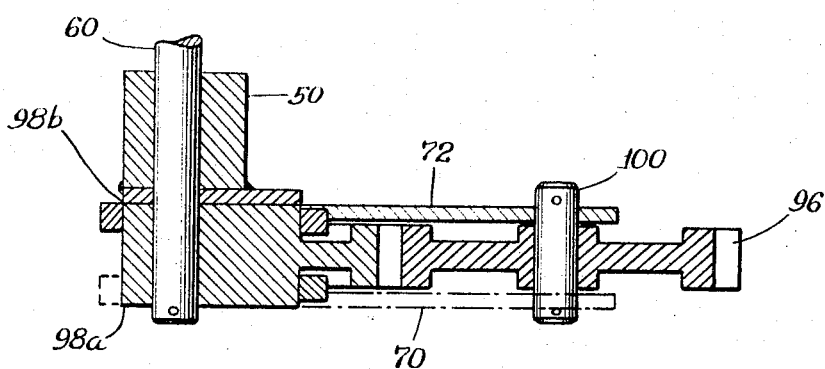
FIGURE 6 is a view in section of the gearing arrangement taken along the line 6—6 of FIGURE 5.

A relative motion control means 36 in the form of gearing arrangements 88 and 90 are associated respectively with linkages 46 and 48 at the front and rear ends of the unit 10. The gearing arrangement 88 is connected to the upper end of thrust arm 82 and the upper ends of link members 50 and 52. The gearing arrangement 88 comprises three gears 92, 94 and 96. The gearing arrangements 88 and 90 are identical except that they are reversed as seen in FIGURE 2. Gear 92 is actually in the form of a gear sector as more clearly seen in FIGURE 5. It is rotatably mounted on pivot pin 60 and is eccentrically mounted with respect to pin 60. The purpose of this will be hereinafter more fully explained. The gear 92 is fixed to the upper end of link member 50. It will be observed that the gear 92 has a large axially extending hub 98a formed thereon which is concentric with the gear teeth periphery.

Gear 94 is freely rotatably journalled on pivot pin 62, and gear 96 is rotatably journalled on pivot pin 100 which is supported in links 70 and 72 of the link structure 58. The gear 96 is an idler gear which is disposed between and in engagement with gears 92 and 94 so as to transmit motion between gears 92 and 94.

Figure 3:
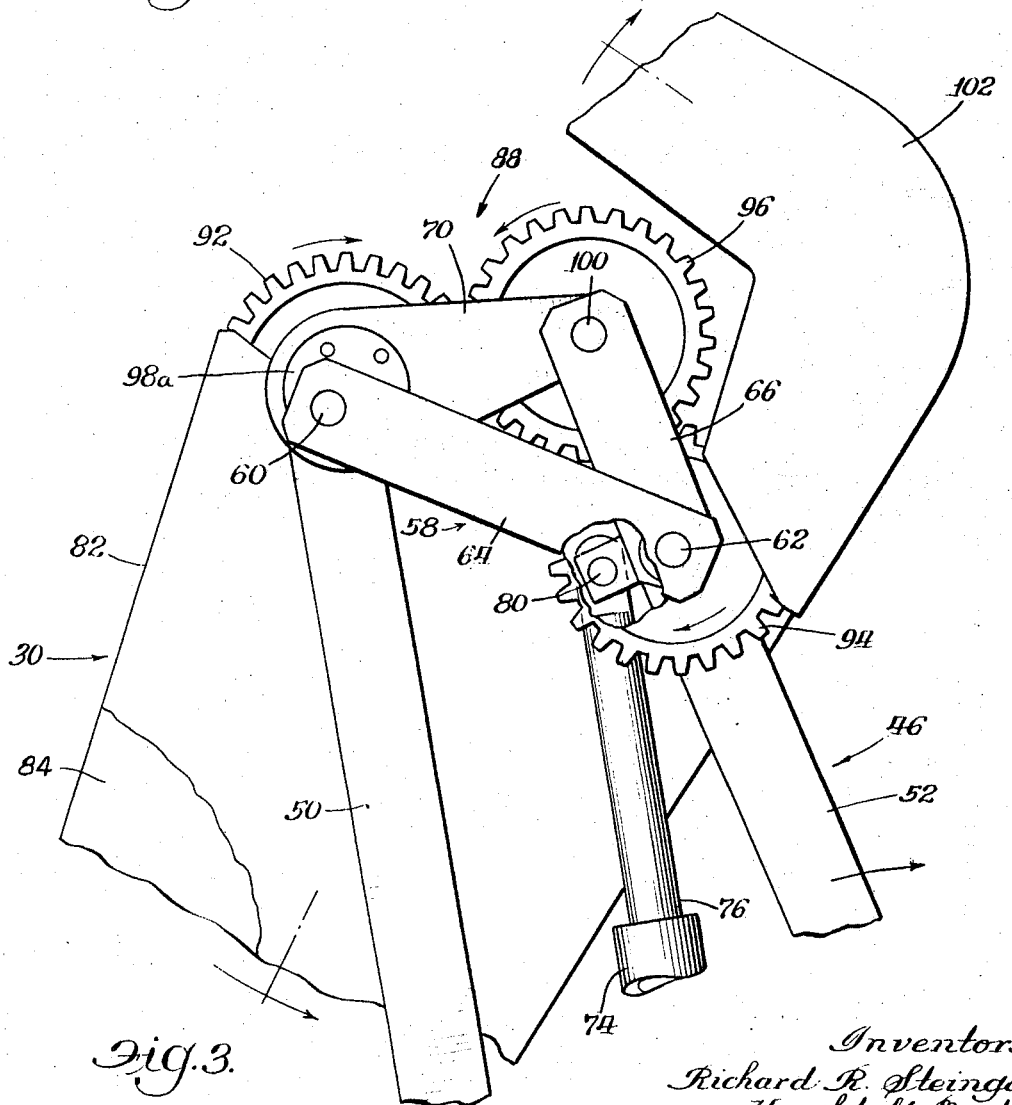
FIGURE 3 is an enlarged elevational view of a portion of the control linkage mechanism of the invention showing also the gear arrangement.

The flat bar link member 70 has one end journalled on the hub 98a as seen in FIGURE 3, and the other on pivot pin 100. The link members 66 and 68 are journalled on pivot pins 62 and 100.

It will be observed that the pivot pin 60 extends through the upper end of link member 50, the gear sector 92 and link 64 and is fixed in the upper end of thrust arm 82 by suitable means such as a weld. The pivot pin 62 extends through the upper end of link member 52, the link members 64, 66 and 68 and is fixed in the upper end of thrust arm 82 by suitable means such as a weld.

The upper support arm means 34 comprises a pair of substantially L-shaped arm members 102 and 104, disposed respectively at the front and rear ends of the unit 10. As best seen in FIGURE 3 the arm 102 is fixed to the gear 94 by welding, for example, and arm 104 is also fixed to the counterpart of gear 94 in gearing arrangement 90 at the other end of the unit 10. The upper ends of arms 102 and 104 are each connected to a cross-arm member 106 which is attached to the upper end of supporting frame 28. Yoke-type brackets 108 and 110 are attached at each end of the cross-bar member and provide pivotal connections 112 and 114 for the arms 102 and 104 respectively.

One of the important inventive features herein lies in the control means 36. By referring particularly to FIGURE 1 it will be observed that when picker panel 26 is to be moved laterally from its retracted position shown in full lines to its extended position shown by the dotted lines this is accomplished by extending the piston-cylinder arrangement 74–76. The particular control means 36 utilized herein is effective to maintain the picker panel 26 in substantially the same attitude throughout its path of lateral movement in moving from the full line position to the dotted line position and vice versa. This attitude generally should be a substantially vertical position so that the picker spindles enter the tree in a straight line movement rather than in a skewed position. If the center of gear 92 were not eccentrically positioned with respect to upper pivotal connection 60 of the arm 50 with the link structure 58, motion would still be effectively transmitted to both the thrust arm 82 and support arm member 102. There would, however, tend to be a slight difference in the positioning of the extreme ends of the thrust arm 82 and support arm member 102 leaving the picker panel in an upwardly tilted position. While the device could be used in that manner, it is more desirable to have the picker panel 26 maintain a substantially vertical position during the complete lateral movement between its retracted and extended positions shown in FIGURE 1.

In order to maintain the picker panel in the substantially vertical position there is provided in the gearing arrangement means for compensating for the difference in the relative motion between the arms 82 and 102. This is done by way of the gear design of gear 92 which is fixed to the link 50. The gear 92, which in effect is the driving gear is arranged in the gearing arrangement so that it delivers a variable output. This is accomplished by eccentrically mounting the gear 92 so that as it rotates its effective radius is varied. Viewing FIGURE 5 in conjunction with FIGURE 1 it will be observed that the full line position of link 50 and gear 92 illustrates the position thereof when the picker panel 26 is in a substantially retracted position and the dotted lines position of link 50 and gear 92 when the picker panel is extended. The radii $r_1$ and $r_2$ are measured from the center of the pivot 60 which is the center of rotation of the gear 92 when it is rotated by movement of the link 50 to which gear 92 is fixed. The radius $r_1$ is less than $r_2$. Thus the radius of the gear 92 measured from the center of rotation 60 gradually increases moving counterclockwise from $r_1$ through $r_2$ as viewed in FIGURE 5. When the link 50 is rotated about its pivot 54 in moving the panel 20 to an extended position the effective radius of gear 92 is gradually increased and thus the output to gear 94 through idler gear 96 is gradually varied.

Circular hubs 98a and 98b are formed on opposite sides of gear 92 concentric with the teeth of gear 92. The rigid link members 70 and 72 are journalled on the hubs 98a and 98b at one end and on pivot pin 100 at the other to maintain the center to center distance $a$ between gears 92 and 96 constant and consequently, keep them in mesh as the gear sector 92 is rotated by actuation of the linkage means 32. Thus idler gear 96 actually floats and rocks back and forth on gear 94 during movement of the linkage means 32 as clearly illustrated in FIGURE 5 when viewing the full and dotted line positions of gear 96.

In FIGURES 7–12 there is illustrated a mechanism for controlling the thrusting of side bars or divider rods, as they are also referred to, into a plant or tree. This mechanism includes the auxiliary frame 40 which is attached to the picker panel 26 by the scissors linkage 42.

The frame 40 comprises a pair of vertically extending substantially U-shaped channel irons 116 and 118 disposed respectively at the front and rear ends of unit 10. They are positioned outwardly of the outer edges of the picker panel 26 and are interconnected at their upper and lower ends by cross bar members 120 and 122 respectively to define essentially a rectangular frame structure. A plurality of side bars 124 are flexibly attached to the channel irons 116 and 118, the ends of the side bars 124 being positioned in substantially V-shaped slots 126 formed in the opposing upstanding legs of the U-shaped channel irons. The side rods 124 are mounted at substantially right angles with channel iron 116. The flexible attachments 128 for securing each of the side rods comprise a pin 130 and a compression spring member 132. The pin 130 extends transversely through the end of the side bar 124, through the channel iron 116 and is secured in place by the compression spring 132 which is held in place by suitable means such as a cotter pin or a cotter pin and washer. Obviously a nut could also be threaded on the end of a pin 130 if the latter were in the form of a long bolt. Normally the spring would rest against the face of the channel iron but in FIGURE 11 a spacer 134 is also shown because part of the scissors linkage channel guide to be later described is shown in that figure. This attachment, of course, provides a yieldable connection between the side bars 124 and their supporting channel iron members so that the side bars may move when they hit branches, for example, when thrust into a tree.

A scissors linkage 42 connects the side bars 124 to the picker panel at each side of the picker panel. The linkage 42 comprises two elongated link members 136 and 138 of equal length pivotally connected at their middle points by hinge pin 140 to form substantially an expandable X-type structure. The lower end of link 136 is pivotally connected to channel iron 116 at 142 and the lower end of link 138 is pivotally connected at 144 to the lower end of a guide member connected to the picker panel 26.

A vertically extending channel guide member 146 is attached to the upper end of channel iron 116 of the auxiliary frame 40 to accommodate the upper end of link 138. A roller 148 is rotatably attached to the upper end of link 138 and rides up and down in the guide member 146 as the scissors linkage opens and closes. A bottom closure 150 is formed on the guide member 146 and serves to limit the movement of the scissors linkage 42 and, consequently, the auxiliary frame 40 and side bars 124 attached thereto.

The upper end of link member 136 also has a roller 152 rotatably attached thereto to be received in vertically extending guide member 154 which is secured to the back side of picker panel 26 by suitable means such as welding or being bolted thereon. The pivotal connection 144 for the lower end of link 138 is supported on the lower end of guide member 154. The upper end of guide member 154 has a channel guide portion formed therein to accommodate the up and down movement of roller 152 in substantially the same manner as the roller 148 is accommodated by the guide member 146.

A hydraulically operated piston cylinder arrangement 156–158 is pivotally connected at 160 to the upper end of link 136, the other end being pivotally connected at 162 by suitable means (not shown) to the picker panel structure. It will be apparent from FIGURES 7–12 that in an extended position the piston cylinder arrangement 156–158 thrusts the auxiliary frame 40 and the side bars 124 away from the picker panel 26. Such action would normally occur before the panel 26 and associated fruit picking spindles 44 are thrust into a tree. A manually operated valve (not shown) is used to admit fluid to cylinder 158 to expand the linkage 42 and thrust the side bars 124 into a tree before the picker panel 26 with its spindles is thrust into the tree. During retraction the piston cylinder arrangement 156–158 is operated as a slave arrangement being actuated by the motion of the linkage means 32.

It will be appreciated that a linkage similar to 42 connects the other side of the auxiliary frame 40 with the picker panel 26 with the same kind of connections.

The overall operation of the unit 10 will now be described. The unit 10 is moved alongside a tree in its traveling position as shown in the full line position of FIGURE 1. A manually operated valve admits fluid to cylinder 158 to extend piston 156 and expand linkage 42 thereby thrusting the side bars 124 into the tree. The piston cylinder arrangement 74–76 may then be hydraulically actuated through controls (not shown) but which may be operable by the driver of the unit 10, to extend the piston 76. Since the piston 76 is connected to link member 52 it gradually pivots the member 52 about the pivot 56 carrying the members 50 and 64 with it. Since the thrust arm member 82 is fixed to the pivot pins 60 and 62 it is gradually moved through an arc to the dotted line position of FIGURE 1, carrying with it the supporting frame 28 and the picker panel 26 attached thereto. The gear sector 92 attached to link 50 is rotated about the pivot 60 and thus transmits motion to the gear 94 through idler gear 96. As shown in FIGURE 3 the gear 94 rotates clockwise thereby moving the arm 102 attached to gear 94 in a clockwise direction. Because the center of rotation of the gear sector 92 is actually disposed eccentrically of the physical center of the gear, but the gears 92 and 96 are held in mesh at all times by link members 70 and 72, the gear 92 delivers a variable output to gear 94 through idler gear 96. Thus the rate of angular movement of the upper support arm member 102 is increased as the effective radius of driving gear 92 is increased during clockwise rotation of gear 92. This compensates for what otherwise would be a lag in the movement of upper support arm 102 and the upper portion of the supporting frame 28 and picker panel 26. Thus the frame 28 and panel 26 are kept in a substantially vertical position. As the picker panel 26 moves laterally to its extended position, the ends of the spindles 44 can move into and out of a tree substantially in a straight line. Since the spindles are not in a skewed position, they are not as subject to undesirable bending. The manipulation of the spindles generally is much easier.

Since the gearing arrangement providing the relative motion control means 36 is effective to maintain the picker panel 26 in a substantially vertical position during both entry into and withdrawal from a tree, it follows that the auxiliary frame 40 is also maintained in a substantially vertical position since the linkage 42 is designed to maintain the auxiliary frame in a relative parallel relation with the picker panel 26.

To withdraw the picker panel 26 from the tree fluid is withdrawn from the cylinder 74 and the operation of linkage means 32 and the gearing arrangement is reversed, the picker panel 26 being kept in substantially the same vertical position during retraction as during extension.

What is claimed is:
1. A fruit harvesting unit comprising:
   a supporting structure;
   a fruit picker panel adapted for lateral movement;
   a frame member for supporting said fruit picker panel;
   linkage means pivotally mounted on said supporting structure;
   relative motion control means operatively associated with said linkage means;
   thrust arm means connected to said linkage means and movable in response to the movement of said linkage means;
   means for actuating said linkage means;
   means operatively associating said thrust arm means with said fruit picker panel;
   support arm means operatively associated with said fruit picker panel and operatively associated with said relative motion control means;
   said relative motion control means being effective when said linkage means is actuated to control the relative positions of said thrust arm means and said support arm means whereby said fruit picker panel is maintained at a desired attitude during lateral movement.

2. The fruit harvesting unit of claim 1 wherein said relative motion control means includes compensating means for maintaining said fruit picker panel in a substantially vertical position during lateral movement.

3. The fruit harvesting unit of claim 1 wherein said relative motion control means includes a variable output gear transmission.

4. The fruit harvesting unit of claim 1 wherein said relative motion control means comprises a gearing arrangement interposed between and operatively associated with said thrust arm means and said support arm means.

5. The fruit harvesting unit of claim 4 wherein said thrust arm means comprises an elongated member the lower end of which is operatively associated with said fruit picker panel,
said linkage means is pivotally connected to the upper end of said thrust arm means, and
one end of said support arm means is operatively associated with said gearing arrangement and the other end of support arm means is operatively associated with said fruit picker panel.

6. The fruit harvesting unit of claim 4 wherein said thrust arm means comprises an elongated member the lower end of which is connected to said frame member,
said linkage means is pivotally connected to the upper end of said thrust arm means,
one end of said support arm means is operatively associated with said gearing arrangement and the other end of said support arm means is connected to said frame member.

7. The fruit harvesting unit of claim 4 wherein said gearing arrangement includes first, second and third gear means, said first gear means being fixed to the upper end of said linkage means, said second gear means being pivotally mounted on said thrust arm means and fixed to the lower end of said support arm means, and said third gear means being disposed between said first and second gear means to transmit motion therebetween.

8. The fruit harvesting unit of claim 7 wherein said first gear means is eccentrically mounted with respect to said linkage means whereby movement of said linkage means causes said first gear means to deliver a variable output to said second gear means.

9. The fruit harvesting unit of claim 4 wherein said linkage means comprises two elongated arm members pivotally mounted at their lower ends on said supporting structure and connected at their upper ends by spaced pivotal connections to the upper end of said thrust arm means.

10. The fruit harvesting unit of claim 9 wherein said gearing arrangement includes first, second and third gear means, said first gear means being fixed to one of said two elongated arm members eccentrically of its pivotal connection with the upper end of said thrust arm means, said second gear means being fixed to said support arm means and concentrically mounted with respect to the pivotal connection of said other elongated arm member with the upper end of said thrust arm means, and said third gear means engages said first and second gear means to transmit motion therebetween.

11. In a fruit picking harvester of the type having a fruit picker panel with a plurality of fruit picking spindles mounted therein the combination comprising:
a linkage means adapted to be pivotally mounted on a supporting structure;
means connected to said linkage means for pivotally actuating said linkage means;
thrust arm means connected to and actuatable by said linkage means and adapted to have the fruit picker panel connected thereto;
support arm means adapted to be connected to the fruit picker panel;
relative motion control means associated with said linkage means and interposed between said thrust arm means and said support arm means whereby movement of said linkage means is effective to position said support arm means at predetermined relative positions to said thrust arm means.

12. The combination of claim 11 wherein said relative motion control means comprises a gearing arrangement adapted to be actuated by movement of said linkage means and to thereby transmit pivotal movement from said linkage means to said support arm means to maintain said support arm means in a predetermined relative position to said thrust arm means.

13. The combination of claim 12 wherein said gearing arrangement includes a first gear fiixed to said linkage means, a second gear fixed to said support arm means, and a third gear pivotally mounted on said linkage means and positioned in engagement with said first and second gear to transmit motion from said linkage means to said support arm means.

14. The device of claim 12 wherein said linkage actuating means includes a piston and cylinder arrangement.

15. The combination of claim 11 wherein said linkage means includes at least one pair of elongated members which are adapted to be pivotally connected to a supporting structure, and
said relative motion control means comprises a plurality of gears for transmitting motion from said linkage means to said support arm means to maintain said support arm means in a predetermined relative position to said thrust arm means, one gear being permanently connected to one of said link members and another of said gears being permanently connected to said support arm means.

16. The combination of claim 12 wherein said gearing arrangement includes means for delivering a variable output to the driven gear means.

17. The combination of claim 12 wherein said gearing arrangement includes one gear which is fixed to said linkage means and is so mounted with respect to said linkage means that pivotal movement of said linkage means causes eccentric rotation of said one gear whereby a variable output from said one gear is produced.

18. A fruit harvesting unit comprising:
a supporting structure;
a fruit picker panel adapted for lateral movement;
first linkage means pivotally mounted on said supporting structure;
relative motion control means operatively associated with said first linkage means;
thrust arm means connected to said first linkage means and movable in response to the movement of said linkage means;
means for actuating said first linkage means;
means operatively associating said thrust arm with said fruit picker panel;
support arm means operatively associated with said fruit picker panel and operatively associated with said relative motion control means;
said relative motion control means being effective when said linkage means is actuated to control the relative positions of said thrust arm means and said support arm means whereby said fruit picker panel is maintained at a desired attitude during lateral movement;
auxiliary frame means having side bars mounted thereon;
scissors linkage means connecting said auxiliary frame means with said picker panel, said scissors linkage when actuated being effective to maintain said auxiliary frame means in a parallel relationship with said picker panel;

means for actuating said scissors linkage, said means including means for actuating said scissors linkage independently of said first linkage means.

19. The fruit harvesting unit of claim 18 wherein said scissors linkage actuating means includes both manual control means and slave control means responsive to said means for actuating said first linkage means.

20. The fruit harvesting unit of claim 18 including flexible support means for mounting said side bars on said auxiliary frame means.

References Cited

UNITED STATES PATENTS

| | | | |
|---|---|---|---|
| 3,129,551 | 4/1964 | Lasswell | 56—328 |
| 3,153,311 | 10/1964 | Pool | 56—328 |

RUSSELL R. KINSEY, *Primary Examiner.*